United States Patent
Yu et al.

(10) Patent No.: US 6,961,382 B1
(45) Date of Patent: Nov. 1, 2005

(54) MOVING PICTURE EXPERTS GROUP DECODING APPARATUS AND METHOD FOR CAPTION DISPLAY

(75) Inventors: Han Ju Yu, Chungcheongnam-do (KR); Don-he Jung, Seoul (KR); Hyuk-jong Wang, Seoul (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 09/484,974

(22) Filed: Jan. 18, 2000

(30) Foreign Application Priority Data

Feb. 1, 1999 (KR) .................................. 99-3221

(51) Int. Cl.$^7$ ............................................. H04N 7/18
(52) U.S. Cl. ............................. 375/240.25; 375/240.26
(58) Field of Search ......... 375/240.76, 240.01–240.29; 348/468, 465; 345/141

(56) References Cited

U.S. PATENT DOCUMENTS

| | | | |
|---|---|---|---|
| 5,917,873 A * | 6/1999 | Shiomoto | 375/376 |
| 5,969,770 A * | 10/1999 | Horton | 348/569 |
| 6,226,047 B1 * | 5/2001 | Ryu | 348/569 |
| 6,297,797 B1 * | 10/2001 | Takeuchi et al. | 345/467 |
| 6,369,855 B1 * | 4/2002 | Chauvel et al. | 348/423.1 |
| 6,373,534 B1 * | 4/2002 | Yasuki | 348/725 |

* cited by examiner

Primary Examiner—Andy Rao
(74) Attorney, Agent, or Firm—Mills & Onello LLP

(57) ABSTRACT

An MPEG decoder for caption display, and a decoding method for caption display are provided. The MPEG decoder demultiplexes an external-applied MPEG stream into an audio stream and a video stream and decodes the video stream and outputs the decoded video stream on a screen. The decoder includes a video decoder for decoding the video stream and extracting user data from the header information of the video stream. A header memory stores the user data. A central processing unit (CPU) produces caption data by decoding the user data and transforming the caption data into on-screen-display (OSD) object data. An OSD controller for transforms the OSD object data into pixel data in response to a predetermined enable signal and outputs the pixel data. A video mixer mixes the pixel data with the decoded video data. In this way, caption data is produced by extracting user information from the header of an MPEG video stream and decoding the user information. The caption data is transformed into OSD data using OSD modules, so that ordinary televisions can perform a caption function.

2 Claims, 4 Drawing Sheets

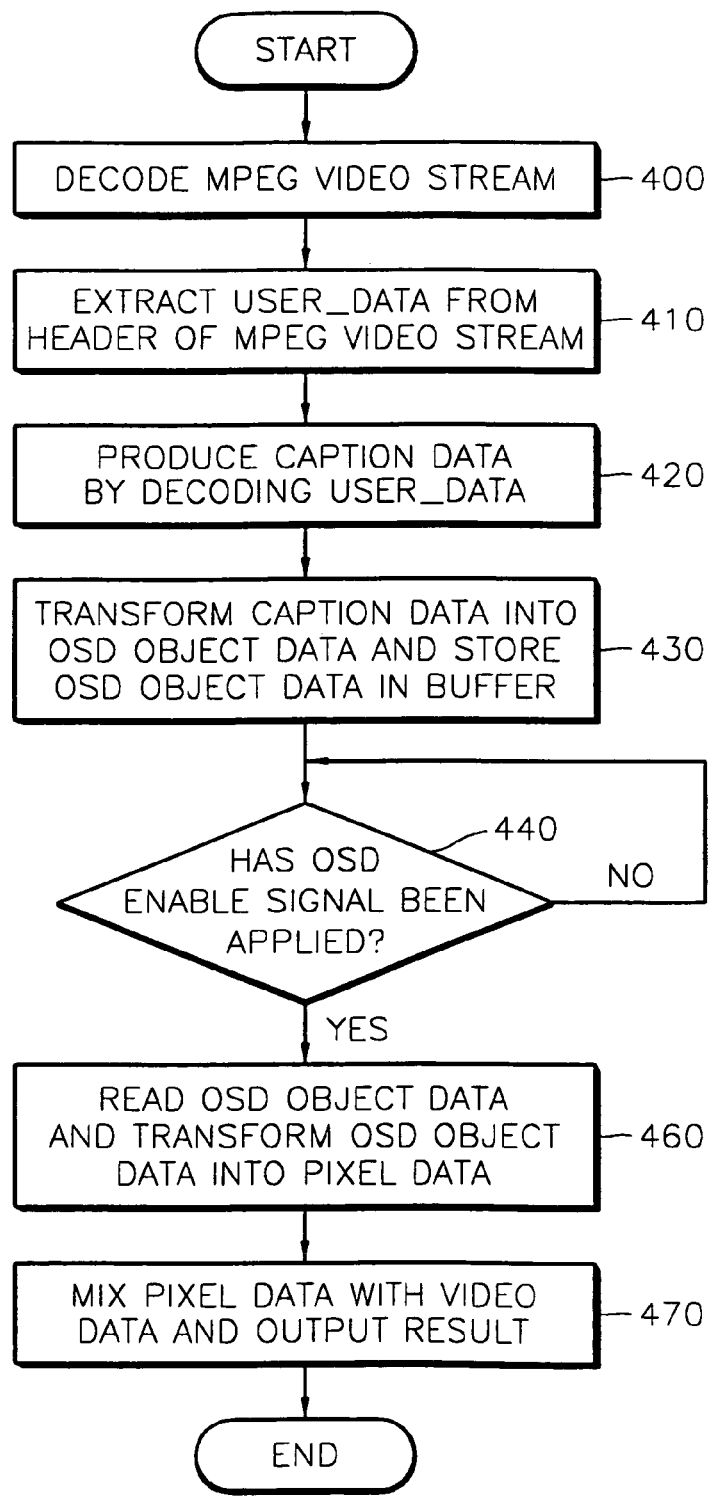

MOVING PICTURE EXPERTS GROUP DECODING APPARATUS AND METHOD FOR CAPTION DISPLAY

BACKGROUND OF THE INVENTION

1. Field of the Invention

The present invention relates to a moving picture experts group (MPEG) decoder, and more particularly, to an MPEG decoder for caption display and a decoding method of the same.

2. Description of the Related Art

A video stream, which is decoded by an MPEG video decoder, has a structure in which a sequence header representing the start of a video sequence and a plurality of groups of pictures (GOPs) are consecutively arranged. Each GOP includes a GOP header and a plurality of pictures such as an I picture, a P picture, and a B picture.

The GOP header includes a user data area. For example, a twenty-first horizontal line in a video stream can be used as the user data area. This user data area is usually used to store caption information.

Generally, a caption function denotes a function of displaying, for example, a Korean or English-language caption on a display screen. In conventional systems, in order to perform a caption function, user data is extracted from the header information of the video stream. The extracted user data is applied as caption data to a video encoder, and generated as an internal caption signal.

FIG. 1 is a schematic block diagram of a conventional MPEG decoder. Referring to FIG. 1, the conventional MPEG decoder includes an MPEG A/V demultiplexer 100, an audio digital-to-analog converter (DAC) 110, a video decoder 120, a header first in first out (FIFO) memory 130, a central processing unit (CPU) 140, and a video mixer 150. Also, the video encoder 160 is shown in FIG. 1 for convenience of explanation.

The MPEG A/V demultiplexer 100 demultiplexes an M-PEG stream applied from an input terminal MIN into a digital audio stream and a video stream. The audio decoder 105 decodes the audio stream applied from the MPEG A/V demultiplexer 100. The audio DAC 110 converts the decoded digital audio stream applied from the MPEG A/V demultiplexer 100 into an analog signal and outputs the analog signal via an audio output terminal A_OUT.

The video decoder 120 decodes the video stream applied from the MPEG A/V demultiplexer 100 and extracts user data USER_DATA from the GOP header of the video stream. The header FIFO memory 130 stores the user data USER_DATA extracted from the GOP header. The CPU 140 receives the user data USER_DATA from the header FIFO memory 130 and outputs the user data USER_DATA as caption information if the user data is determined to be caption information. The video mixer 150 mixes a video signal decoded by the video decoder 120 with on-screen-display (OSD) data applied from an OSD controller (not shown) and outputs the result to the video encoder 160. The video encoder 160 encodes the output of the video mixer 150 and the user data USER_DATA, that is, caption data, output from the CPU 140, and outputs the result of encoding via a video output terminal V_OUT.

In the conventional MPEG decoder shown in FIG. 1, user data USER_DATA extracted from the header of an MPEG video stream is directly output to the video encoder 160 in order to perform a caption function. The caption function is therefore achieved by expensive encoders or televisions which are specially manufactured to include the caption function. Thus, in the prior art, ordinary televisions cannot perform a caption function.

SUMMARY OF THE INVENTION

An object of the present invention is to provide a moving picture experts group (MPEG) decoder for caption display in which caption data is output using an on-screen-display (OSD) module, thus allowing ordinary televisions to perform a caption function.

Another object of the present invention is to provide a decoding method performed in the MPEG decoder.

Accordingly, to achieve the first object, the present invention provides a moving picture experts group (MPEG) decoder for demultiplexing an external-applied MPEG stream into an audio stream and a video stream and for decoding the video stream and outputting the decoded video stream on a screen. The device includes a video decoder for decoding the video stream and extracting user data from the header information of the video stream. A header memory stores the user data. A central processing unit (CPU) produces caption data by decoding the user data and transforms the caption data into on-screen-display (OSD) object data. An OSD controller transforms the OSD object data into pixel data in response to a predetermined enable signal and outputs the pixel data. A video mixer mixes the pixel data with the decoded video data.

To achieve the second object, the present invention provides a MPEG decoding method. An MPEG video stream is decoded, and user data is extracted from the header of the MPEG video stream. Caption data is produced by decoding the user data. The caption data is transformed into OSD object data, and the OSD object data is stored. The OSD object data is transformed into pixel data if an OSD enable signal has been applied. The pixel data is mixed with video data, and the resultant data is provided as output.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is a flowchart illustrating one embodiment of an MPEG decoding method according to the invention which can be performed in the MPEG decoder shown in FIG. 2.

DESCRIPTION OF PREFERRED EMBODIMENTS OF THE INVENTION

Figure 1:
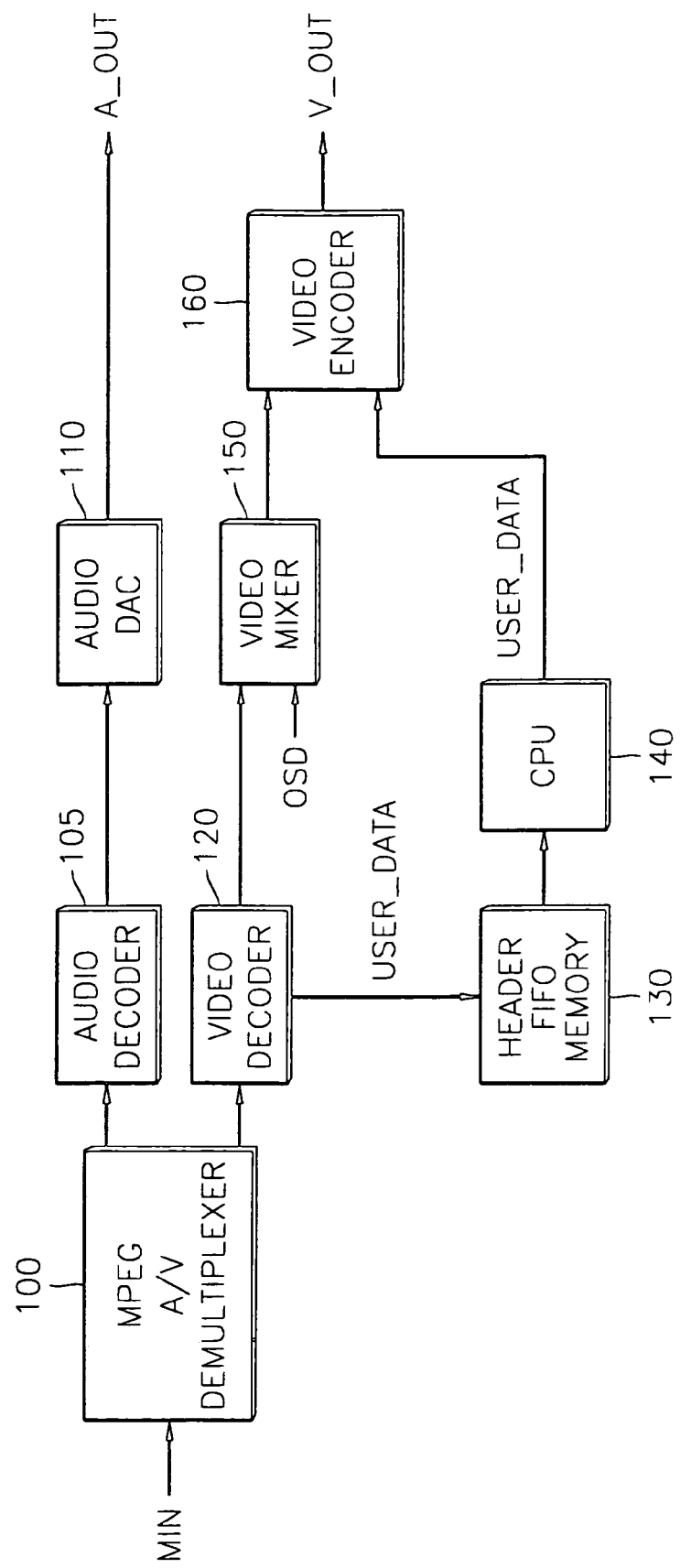
FIG. 1 is a schematic block diagram of a conventional moving picture experts group (MPEG) decoder.
Figure 2:
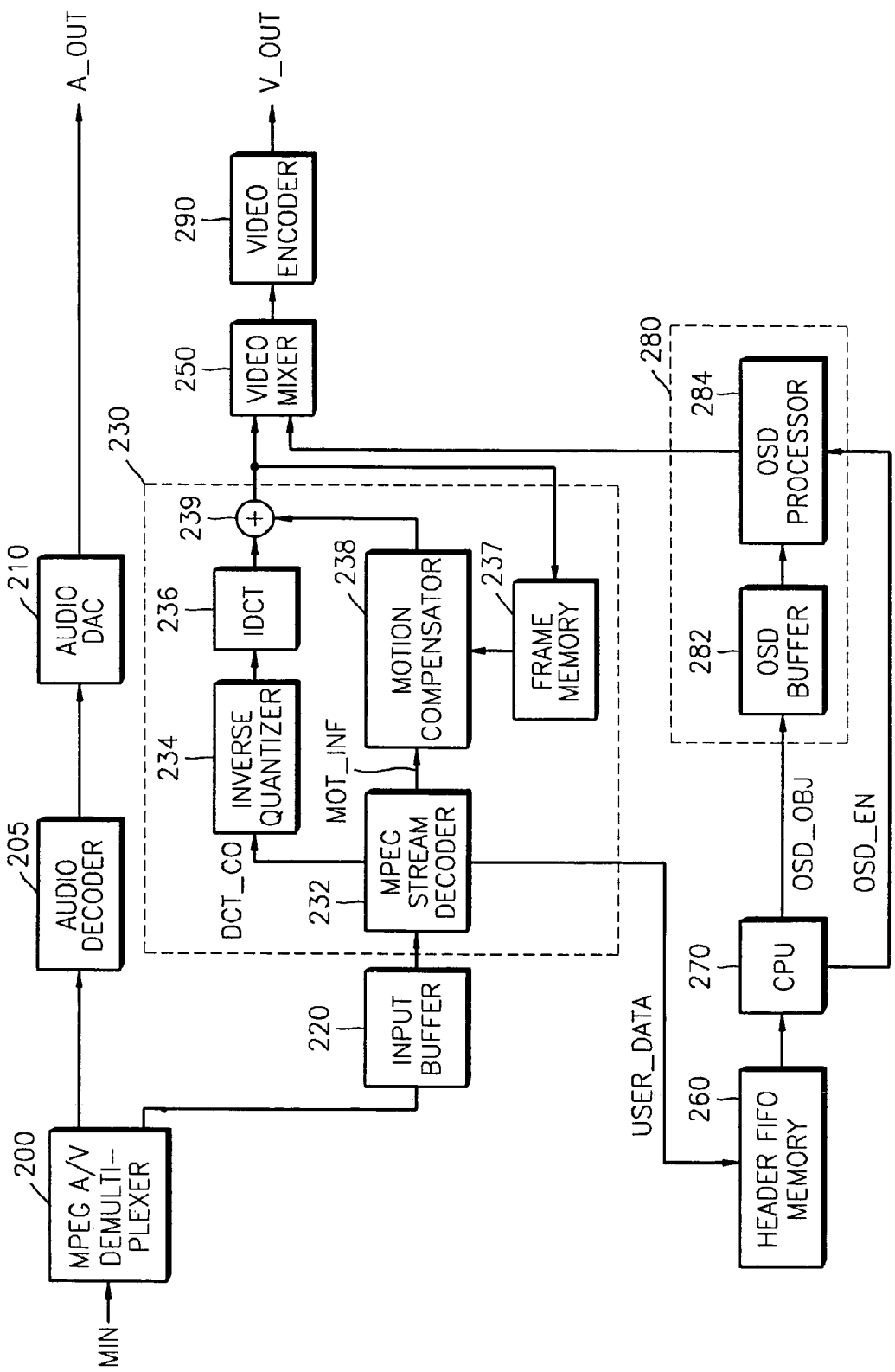
FIG. 2 is a schematic block diagram of one embodiment of an MPEG decoder for caption display according to the present invention.

Referring to FIG. 2, one embodiment of a moving picture experts group (MPEG) decoder for caption display according to the present invention includes an MPEG audio/video (A/V) demultiplexer 200, an audio digital-to-analog converter (DAC) 210, an input buffer 220, a video decoder 230, a header first in first out (FIFO) memory 260, a central processing unit (CPU) 270, an on-screen-display (OSD) controller 280, and a video mixer 250. FIG. 2 also shows a video encoder 290.

The MPEG A/V demultiplexer 200 receives an MPEG stream from an external source via an input terminal MIN and demultiplexes the received MPEG stream into a digital audio stream and a video stream. The MPEG stream can be applied from a data processor of an external device such as a compact disc player (CDP) or a digital versatile disc player (DVDP). Also, the MPEG stream is defined as a signal which can be applied to a hard disc or a compact disc when it is adapted to computers.

The audio decoder 205 decodes the audio stream applied from the MPEG A/V demultiplexer 200. The audio DAC 210 converts the decoded digital audio stream into an analog audio signal and outputs the converted analog audio signal via an audio output terminal A_OUT. The input buffer 220 buffers the video stream and outputs the buffered video stream to the video decoder 230. The video decoder 230 decodes the video stream buffered by the input buffer 220 and outputs the decoded result to the video mixer 250.

The video decoder 230 includes an MPEG stream decoder 232, an inverse quantizer 234, an inverse discrete cosine transformer (IDCT) 236, a frame memory 237, a motion compensator 238, and an adder 239. The video decoder 230 decodes, inversely quantizes, and inversely discrete cosine transforms (IDCT) the video bit stream, compensates for the motion of the video bit stream, and outputs the result to the video mixer 250. Also, the video decoder 230 extracts user data USER_DATA from the group of picture (GOP) header information of the video bit stream.

The header FIFO memory 260 stores the user data USER_DATA extracted by the video decoder 230. The CPU 270 decodes the user data USER_DATA output from the header FIFO memory 260 and produces caption data. The caption data is transformed into OSD object data OSD_OBJ and is stored in the OSD buffer 282 of the OSD controller 280. Here, the OSD object data is defined as data including information on the positions, sizes and colors of OSD characters to be displayed on a screen.

Also, the CPU 270 produces an OSD enable signal OSD_EN (not shown) for displaying caption data on a screen. Here, the OSD enable signal OSD_EN may use the start bit of the 270. The OSD object data OSD_OBJ can be considered as data transformed by caption information when a caption function is performed. However, when an ordinary function is performed, the OSD object data is considered as data for displaying ordinary OSD characters.

The OSD processor 284 reads the OSD object data from the OSD buffer 282, and transforms the OSD object data into pixel data. The OSD processor 284 includes a buffer interface unit 32, a text OSD (T_OSD) module 34, a bit map OSD (B_OSD) module 36, a text color look-up table (T_CLUT) 35, a bit map color look-up table (B_CLUT) 39, and an OSD mixer 37. The OSD processor 284 can be configured using one of T_OSD module 34 and B_OSD module 36. In this case, OSD mixer 37 is not used, but one look-up table of T_CLUT 35 and B_CLUT 39 is used. The buffer interface unit 32 in the OSD processor 284 receives the OSD object data OSD_OBJ from the OSD buffer 282 and transmits the same to the internal block of the OSD processor 284.

The T_OSD module 34, for displaying text information, receives the OSD object data OSD_OBJ as text OSD information and transforms the text OSD information as pixel data. Also, the T_OSD module 34 includes a font look-up table for loading a bit map font. The B_OSD module 36 receives the OSD object data OSD_OBJ as bit map OSD information and transforms the bit map OSD information as pixel data.

The T_CLUT 35 stores color information for outputting text OSD information, and B_CLUT 39 stores color information for outputting bit map OSD information. The OSD mixer 37 receives text pixel data from the T_OSD module 34 and bit map pixel data from the B_OSD module 36, mixes them, and outputs the result of mixing to the video mixer 250 via an output terminal OSD_OUT. As described above, the OSD object data OSD_OBJ transformed from caption data is transformed into pixel data by the T_OSD module 34.

FIG. 4 is a flowchart illustrating one embodiment of an MPEG decoding method for caption display according to the present invention. The MPEG decoding method includes steps 400 and 410 of decoding an MPEG video stream and of extracting user data from the header of the MPEG video stream, steps 420 and 430 of producing caption data by decoding the user data and of transforming the caption data into OSD object data, and steps 440, 460 and 470 of determining whether an OSD enable signal has been applied, of transforming the OSD data into OSD object data OSD_OBJ, or a special enable signal may be produced and output to the OSD processor 284. The CPU 270 can be a reduced instruction set computer (RISC) processor.

The OSD controller 280 includes an OSD buffer 282 and an OSD processor 284. The OSD controller 280 transforms the OSD object data OSD_OBJ output from the CPU 270 into pixel data in response to the OSD enable signal OSD_EN and outputs the pixel data to the video mixer 250. The video mixer 250 mixes a video signal decoded by the video decoder 230 with the pixel data output from the OSD controller 280. The video encoder 290 encodes the data output from the video mixer 250 and outputs the encoded data via a video output terminal V_OUT. An audio signal output via the audio output terminal A_OUT and a video signal output via the video output terminal V_OUT are reproduced on a television monitor.

More specifically, in the video decoder 230 of the MPEG decoder shown in FIG. 2, the MPEG stream decoder 232 decodes a video stream received from the input buffer 220 and outputs a DCT coefficient DCT_CO and motion information MOT_INF. The motion information MOT_INF is information which can include a motion vector value for compensating for the motion of a video signal. The DCT coefficient DCT_CO is inversely quantized by the inverse quantizer 234, and the inversely-quantized result is IDC transformed by the IDCT 236.

The motion compensator 238 compensates for the motion between a present picture and a past picture which is stored in the frame memory 237, using the motion information MOT_INF vector output from the MPEG stream decoder 232. The adder 239 adds the compensated result of the motion compensator 238 to the output of the IDCT 236 and produces a decoded video signal. The video signal output from the adder 239 is stored as a past picture in the frame memory 237. It is used to compensate for the motion of a picture which is applied later.

As described above, the MPEG decoder shown in FIG. 2 extracts user data from the GOP header of an MPEG stream and decodes the user data. The decoded caption data is transformed into OSD data, and the OSD data is output via the OSD controller 280, such that a caption function is performed.

Figure 3:
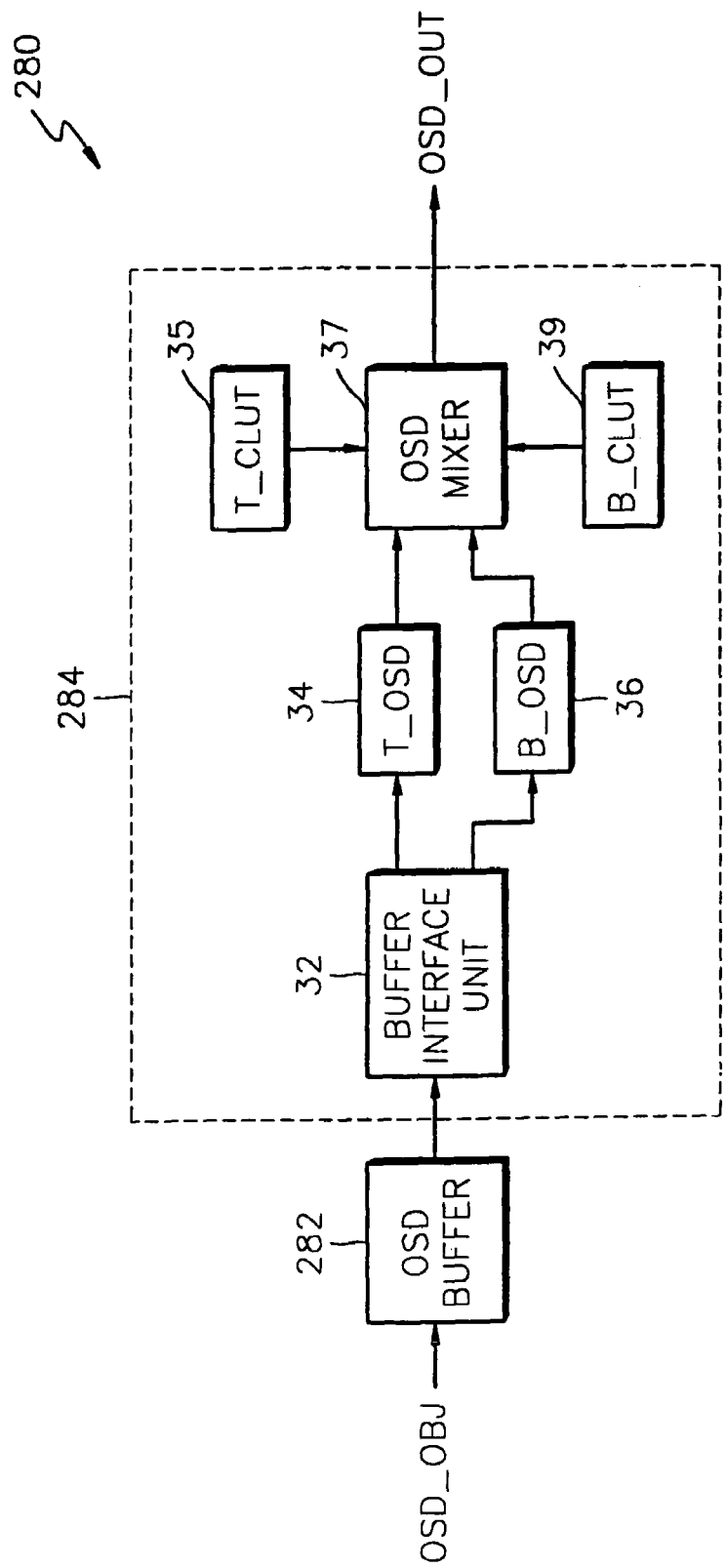
FIG. 3 is a detailed schematic block diagram of the on-screen-display (OSD) controller in the MPEG decoder shown in FIG. 2.

FIG. 3 illustrates an embodiment of the OSD controller 280 shown in FIG. 2. Referring to FIG. 3, the OSD controller 280 includes an OSD buffer 282 and an OSD processor 284. The OSD buffer 282 is usually installed in a memory such as a dynamic random access memory (DRAM). The OSD buffer 282 stores the OSD object data OSD_OBJ received from the CPU pixel data if the OSD enable signal has been applied, and of mixing the pixel data with video data and outputting the result.

The method of FIG. 4 will now be described in detail. The video decoder 230 of the MPEG decoder decodes an MPEG video stream in step 400. In this step, the MPEG stream decoder 232 decodes the MPEG video bit stream and produces a DCT coefficient DCT_CO and motion information MOT_INF. The DCT coefficient undergoes inverse quantization and IDCT processes. The resultant coefficient is added to motion-compensated video data, and the added result is applied to the video mixer 250. After the MPEG bit stream is decoded in step 400, the MPEG stream decoder 232 extracts user data USER_DATA from the header of the bit stream in step 410. Then, the user data USER_DATA is transmitted to the CPU 270 via the header FIFO memory 260. The CPU 270 decodes the user data USER_DATA and produces caption data in step 420.

In step 430, the CPU 270 transforms the received caption data into OSD object data OSD_OBJ and stores the OSD object data OSD_OBJ in the OSD buffer 282. Then, in step 440, a determination is made as to whether an OSD enable signal OSD_EN for displaying OSD data has been applied from the CPU 270.

If it is determined in step 440 that the OSD enable signal OSD_EN has been applied, the OSD processor 284 reads OSD object data from the OSD buffer 282 and transforms the OSD object data into pixel data, in step 460. That is, the T_OSD module 34 in the OSD processor 284 obtains pixel data corresponding to the OSD object data OSD_OBJ stored in the OSD buffer 282. On the other hand, if it is determined in step 440 that the OSD enable signal OSD_EN has not been applied, the operation of the MPEG decoder remains in a waiting condition in step 440.

When the OSD object data is transformed into pixel data in step 460, the OSD processor 284 outputs the pixel data to the video mixer 250. The video mixer 250 mixes the video data decoded by the MPEG video decoder 236 with the pixel data, in step 470. The output data of the video mixer 250 is encoded by the video encoder 290 and can be displayed on a television screen. Accordingly, conventional televisions can also perform a caption function by decoding an MPEG stream through the above-described processes.

According to the present invention, caption data is produced by extracting user information from the header of an MPEG video stream and decoding the user information, and the caption data is transformed into OSD data using OSD modules, so that ordinary televisions can perform a caption function. Also, the MPEG decoding method for caption display according to the present invention can be applied to various systems adopting an MPEG decoder, so that a low-priced system having a caption function can be realized.

While this invention has been particularly shown and described with references to preferred embodiments thereof, it will be understood by those skilled in the art that various changes in form and details may be made therein without departing from the spirit and scope of the invention as defined by the following claims.

What is claimed is:

1. A moving picture experts group (MPEG) decoder for producing a caption for display on a screen, said MPEG decoder producing a video stream from an externally-applied MPEG stream, the MPEG decoder comprising:
   a video decoder for decoding the video stream and extracting user data from header information of the video stream, the user data indicating whether the video stream includes caption data;
   a header memory for storing the user data;
   a central processing unit (CPU) for (i) decoding the user data, (ii) determining from the user data whether the video stream includes caption data, (iii) transforming the caption data into on-screen-display (OSD) object data, and (iv) generating an OSD Enable signal if the video stream contains caption data;
   an OSD controller for receiving the OSD Enable signal and transforming the OSD object data into pixel data in response to the enable signal and outputting the pixel data as pixel data output; wherein the OSD controller comprises:
   an OSD buffer for storing the OSD object data received from the CPU; and
   an OSD processor comprising:
      a buffer interface unit for receiving the OSD object data from the OSD buffer and for outputting the OSD object data;
      a text OSD module for receiving the OSD object data from the buffer interface unit as text OSD data and for transforming the text OSD data and outputting text pixel data;
      a bitmap OSD module for receiving the OSD object data from the buffer interface unit as bitmap OSD data and for transforming the bitmap OSD data and outputting bitmap pixel data; and
      an OSD mixer for receiving the text pixel data and the bitmap pixel data and outputting a resulting mixture as the pixel data output; and
   a video mixer for mixing the pixel data output with the decoded video data.

2. An MPEG decoding method comprising the steps of:
   (a) decoding an MPEG video stream;
   (b) extracting user data from the header of the MPEG video stream, the user data indicating whether the video stream includes caption data;
   (c) decoding the user data;
   (d) determining from the user data whether the video stream includes caption data;
   (e) transforming the caption data into OSD object data and storing the OSD object data;
   (f) generating an OSD Enable signal if the video stream includes caption data;
   (g) determining whether the OSD Enable signal has been generated;
   (h) generating text OSD data and bitmap OSD data from the OSD object data;
   (i) transforming at least one of the text OSD data and bitmap OSD data into text pixel data and bitmap pixel data, respectively, if the OSD Enable signal has been generated;
   (j) mixing the text pixel data and the bitmap pixel data to produce a pixel data output; and
   (k) mixing the pixel data output with video data and outputting the resultant data.

\* \* \* \* \*